United States Patent
Campbell

(10) Patent No.: US 10,183,444 B2
(45) Date of Patent: Jan. 22, 2019

(54) MODULAR MULTI-STATION THREE-DIMENSIONAL OBJECT PRINTING SYSTEMS

(71) Applicant: Xerox Corporation, Norwalk, CT (US)

(72) Inventor: Richard A. Campbell, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 666 days.

(21) Appl. No.: 14/692,805

(22) Filed: Apr. 22, 2015

(65) Prior Publication Data

US 2016/0311166 A1    Oct. 27, 2016

(51) Int. Cl.
- *B29C 67/00* (2017.01)
- *B29C 64/20* (2017.01)
- *B29C 64/112* (2017.01)

(52) U.S. Cl.
CPC ............ *B29C 64/20* (2017.08); *B29C 64/112* (2017.08)

(58) Field of Classification Search
CPC .............................. B33Y 30/00; B33Y 40/00
See application file for complete search history.

(56) References Cited

U.S. PATENT DOCUMENTS

| | | | |
|---|---|---|---|
| 2,765,547 A | 10/1956 | Dimmel et al. | |
| 2,944,275 A | 7/1960 | Markusen | |
| 5,904,100 A | 5/1999 | Findley et al. | |
| 6,191,507 B1 | 2/2001 | Peltier et al. | |
| 6,688,021 B2 | 2/2004 | Baig et al. | |
| 7,070,250 B2 | 7/2006 | Lester et al. | |
| 8,167,395 B2 | 5/2012 | Fienup et al. | |
| 8,288,004 B2 | 10/2012 | Moorlag et al. | |
| 8,692,011 B2 | 4/2014 | Moorlag et al. | |
| 8,851,664 B2 | 10/2014 | Spence | |
| 2011/0125307 A1 | 5/2011 | Dickson et al. | |
| 2012/0157277 A1 | 6/2012 | Moorlag et al. | |
| 2013/0293652 A1 | 11/2013 | Spence et al. | |
| 2013/0293653 A1 | 11/2013 | Spence et al. | |
| 2014/0125749 A1 | 5/2014 | Spence | |
| 2014/0271328 A1* | 9/2014 | Burris ................. | B23K 26/034 419/53 |

(Continued)

FOREIGN PATENT DOCUMENTS

| | | |
|---|---|---|
| CN | 203005461 U * | 6/2013 |
| EP | 2 474 418 B1 | 7/2012 |

*Primary Examiner* — Ryan M Ochylski
(74) *Attorney, Agent, or Firm* — Maginot Moore & Beck LLP

(57) ABSTRACT

A three-dimensional object printing module has been developed. The printing module includes a first processing station configured to perform an operation. The printing module further includes a track configured to guide a cart moved by a motive force in a first direction to the first processing station and to guide the cart moved by the motive force in the first direction from the first processing station. The printing module further includes at least one lead screw disposed parallel to the first direction along the track at the first processing station and configured to engage the cart at the first processing station. The printing module further includes an actuator operatively connected to the at least one lead screw and configured to rotate the lead screw bi-directionally about a longitudinal axis of the lead screw to enable the cart to move along the track at the processing station without the motive force.

20 Claims, 5 Drawing Sheets

(56) References Cited

U.S. PATENT DOCUMENTS

2016/0263824 A1* 9/2016 Roscoe ............... B29C 67/0059
2017/0050386 A1* 2/2017 Houben ................ B33Y 10/00
2017/0239884 A1* 8/2017 Batchelder .......... B29C 67/0055

* cited by examiner

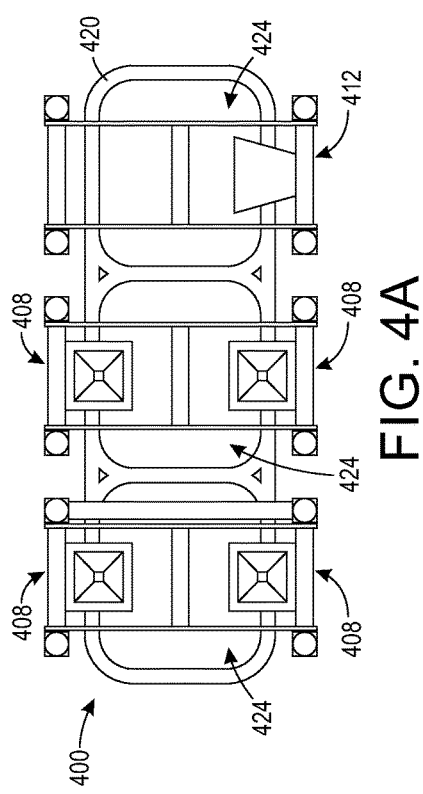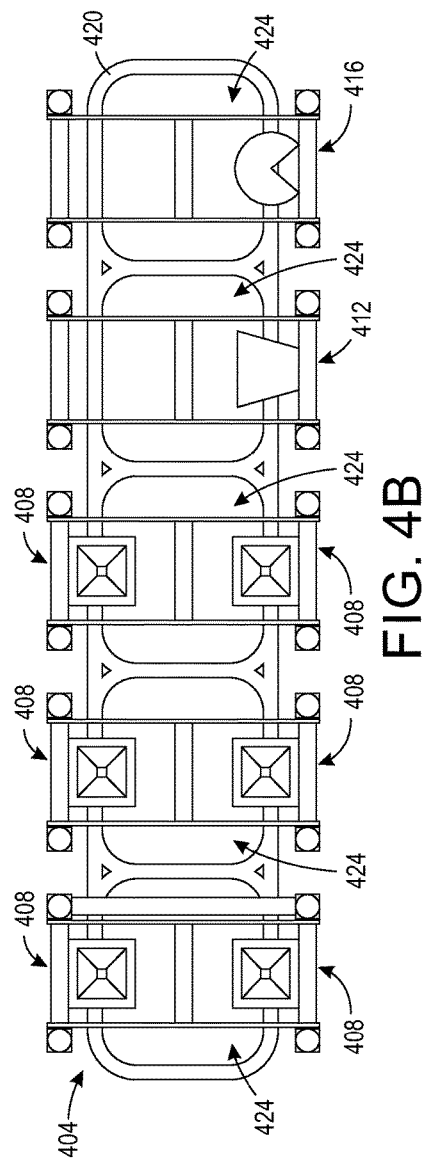

MODULAR MULTI-STATION THREE-DIMENSIONAL OBJECT PRINTING SYSTEMS

TECHNICAL FIELD

The device and method disclosed in this document relates to three-dimensional object manufacturing and, more particularly, to multi-station three-dimensional object manufacturing systems.

BACKGROUND

Digital three-dimensional manufacturing, also known as digital additive manufacturing, is a process of making a three-dimensional solid object of virtually any shape from a digital model. Three-dimensional printing is an additive process in which one or more printheads or ejector heads eject successive layers of material on a substrate in different shapes. The substrate is supported either on a platform that can be moved three dimensionally by operation of actuators operatively connected to the platform, or the printhead or printheads are operatively connected to one or more actuators for controlled movement of the printhead or printheads to produce the layers that form the object. Three-dimensional printing is distinguishable from traditional object-forming techniques, which mostly rely on the removal of material from a work piece by a subtractive process, such as cutting or drilling.

In some three-dimensional printing systems, certain intermediate processing steps and post-processing steps are performed in addition to the ejection of layers of material. For example, a substrate may be planarized, cured, or cooled between ejecting material layers or after completing a printed object. Three-dimensional printing systems have been developed that have multiple processing stations, each configured to perform different processes involved in manufacturing a finished three-dimensional object. Such multi-station three-dimensional printing systems often comprise a track that guides a cart from one processing station to another. The cart rides along the track to convey a substrate between processing stations. The cart is generally moved along the track by a motive force generated by a motor such as a linear synchronous motor (LSM) or a linear induction motor (LIM). LSM and LIM technology allows for quick and reliable motion of the cart between stations, but does not provide enough force and resilience to operate under the various loads that the cart may encounter at the various processing stations. What is needed is a three-dimensional printings system that takes advantage of the speed and flexibility of LSM and LIM technology while also providing accurate motion at processing stations that is resilient against weight, speed, and load changes associated with the variety of processing steps required to manufacture a finished three-dimensional object.

SUMMARY

A three-dimensional object printing module has been developed. The printing module includes a first processing station configured to perform an operation. The printing module includes a track configured to guide a cart moved by a motive force in a first direction to the first processing station and to guide the cart moved by the motive force in the first direction from the first processing station. The printing module includes at least one guide disposed parallel to the first direction along the track at the first processing station and configured to engage the cart at the first processing station. The printing module includes at least one actuator operatively connected to the at least one guide and configured to move the cart along the track at the processing station without the motive force.

A three-dimensional object printing system has been developed. The printing system includes a plurality of printing modules configured operate together to manufacture a three-dimensional object. The plurality of printing modules are interconnected to enable a cart to convey the three-dimensional object between one of the plurality of printing modules to another of the plurality printing modules. Each printing module includes a processing station configured to perform an operation. Each printing module includes a track configured to guide the cart moved by a motive force in a first direction to the first processing station and to guide the cart moved by the motive force in the first direction from the first processing station. Each printing module includes at least one guide disposed parallel to the first direction along the track at the first processing station and configured to engage the cart at the first processing station. Each printing module includes at least one actuator operatively connected to the at least one guide and configured to move the cart along the track at the processing station without the motive force.

BRIEF DESCRIPTION OF THE DRAWINGS

The foregoing aspects and other features of a three-dimensional object printing module are explained in the following description, taken in connection with the accompanying drawings.

FIG. 4a and FIG. 4b show multi-station three-dimensional object printing systems.

DETAILED DESCRIPTION

Figure 1:
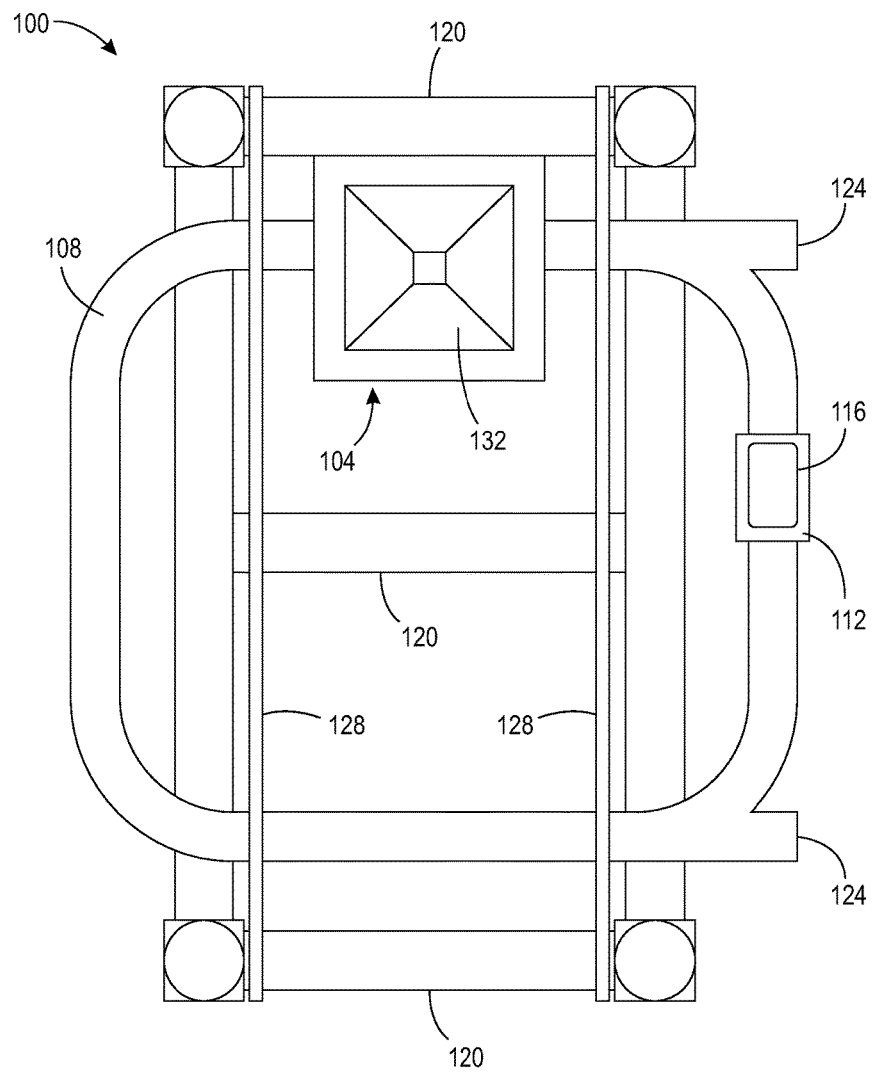
FIG. 1 shows a three-dimensional object printing module.

For a general understanding of the environment for the three-dimensional object printing module disclosed herein as well as the details for the three-dimensional object printing module, reference is made to the drawings. In the drawings, like reference numerals designate like elements.

FIG. 1 depicts an exemplary three-dimensional object printing module 100. The printing module 100 includes a processing station 104 disposed along a track 108. A cart 112 is configured to move along the track to convey a substrate 116 to and from the processing station 104. The processing station 104 and the track 108 are structurally supported by a plurality of support structures 120. In some embodiments, the printing module 100 is one of several printing modules configured to operate together to manufacture a finished three-dimensional object. The track 108 includes connecting portions 124 configured to interconnect with a compatible connecting portion of a track of another printing module. The cart 112 is configured to move from one printing module to another via the connecting portions 124 of the track 108. In some embodiments, side walls 128 are included to isolate the processing station 104 from processing stations of other printing modules.

The processing station 104 is configured to perform an operation or process on the substrate 116. In one embodiment, the processing station 104 includes a printhead 132 having at least one ejector configured to eject layers of material on the substrate 116 to form a three-dimensional object. In another embodiment, the processing station 104 includes a planarizer configured to planarize the substrate 116. "Planarize" as used in this document refers to the removal of material from an upper surface of an object to produce a level and smooth top surface substantially free from vertical irregular features. In another embodiment, the processing station 104 includes a curing or cooling device configured to cure or cool the substrate 116. In further embodiments, the procession station 104 includes other equipment configured to perform other operations or processes required for manufacturing a finished three-dimensional object.

The track 108 includes a motor configured to move the cart 112 along the track 108 by providing a motive force. In one embodiment, the motor is a linear synchronous motor (LSM) or a linear induction motor (LIM) embedded within the track 108. The cart 112 includes a magnet 204 attached to its bottom surface (See FIG. 2b). The LSM or LIM is configured to generate electromagnetic fields that interact with the magnet 204 and move the cart 112 along the track 108. The LSM or LIM provides reliable and fast movement of the cart 112 along the track 108. However, as discussed above, LSM and LIM technology is not always resilient against the weight, speed, and load changes associated with the variety of processing steps required to manufacture a finished three-dimensional object. With the use of the LSM or LIM alone, the cart 112 is held in place only by magnetic forces and nominal friction with the track 108. When the cart 112 is at a portion of the track 108 corresponding to the processing station 104, called a "processing zone," the cart 112 must be moved precisely and accurately under the various stresses of the operation or process being performed by the processing station 104. To provide increased resilience, the processing zone includes a precision track section 208 that is configured to mechanically engage the cart 112 and dock the cart 112 at the processing station 104 (See FIGS. 2a and 2b).

Figure 2A:
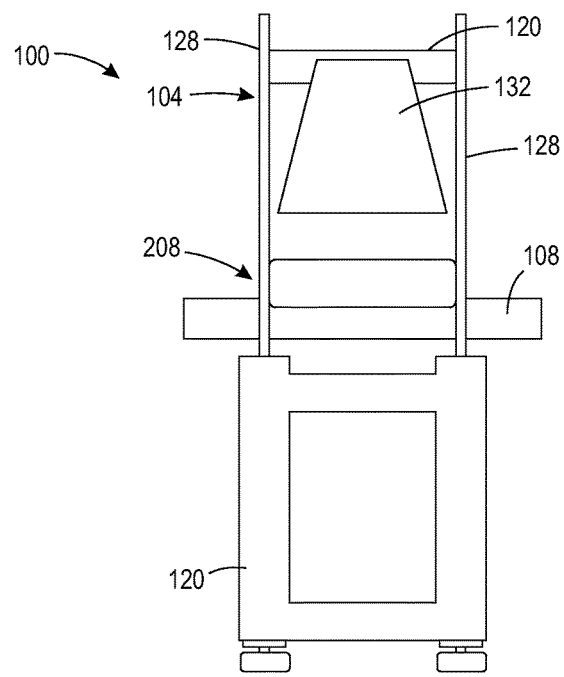
FIG. 2a and FIG. 2b show views of the printing module of FIG. 1.
Figure 2B:
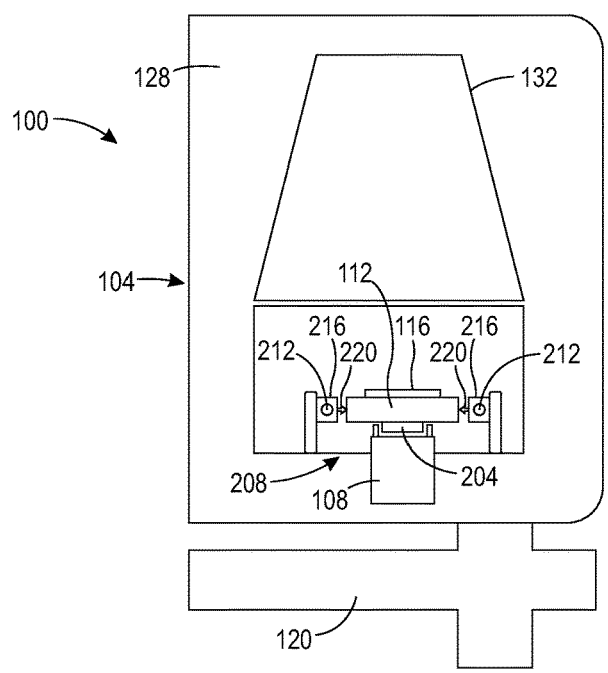

FIG. 2a shows a side view of the printing module 100 and FIG. 2b shows a partial side view of the printing module 100 rotated ninety degrees from the view of FIG. 2a. The track 108 includes the precision track section 208 at the processing station 104. The precision track section 208 includes at least one guide configured to engage the cart 112 at the processing station 104. In one embodiment, the precision track section 208 includes a pair of lead screws 212 disposed in parallel, one on each side of the track 108. Members 216 are disposed around the leads screws 212 and configured to move along the lead screws 212. The members 216 include at least one engagement pin 216 or other engagement device configured to engage with the cart 112 to dock the cart 112 at the processing station 104. As used herein, "engagement pin" or "pin" refers to any device or devices suitably configured to secure the lead screw to the cart 112 to enable linear movement produced by the lead screw to move the cart.

Figure 3A:
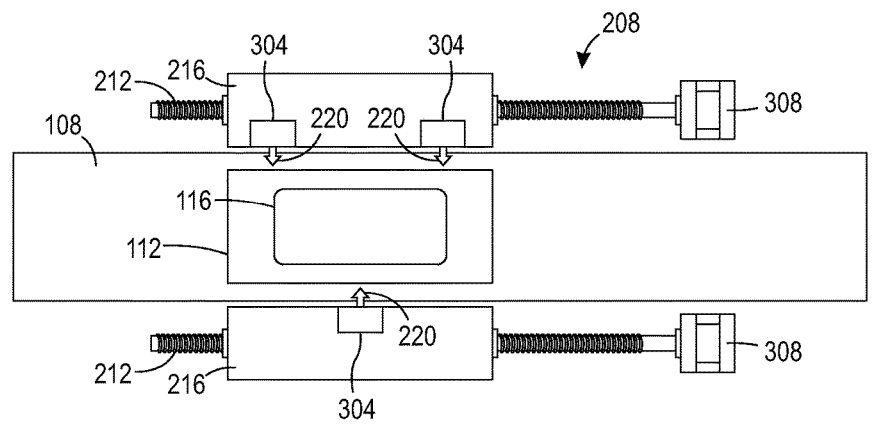
FIG. 3a and FIG. 3b depict a docking process of a cart at a processing station.
Figure 3B:
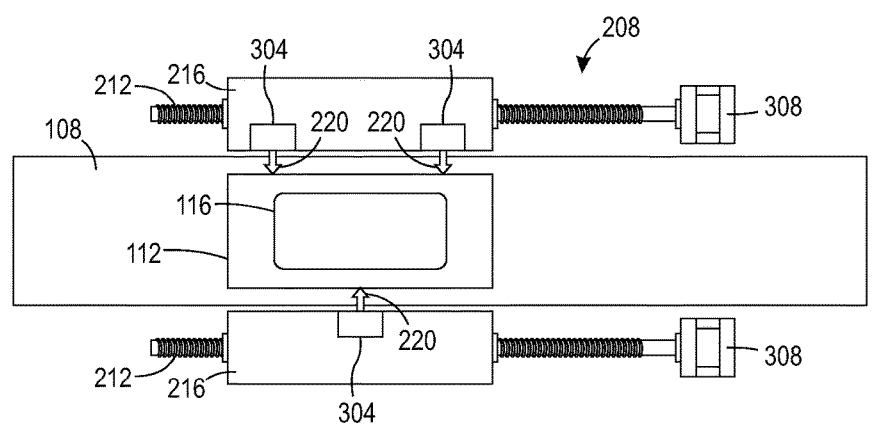

FIG. 3a and FIG. 3b are top plan views that provide a more detailed depiction of how, in one embodiment, the cart 112 docks with the lead screws 212 at the processing station 104. In FIG. 3a, the cart 112 has been moved along the track 108 by the LSM or LIM within the track 108 and has arrived at the precision track section 208 that corresponds to the processing station 104. The members 216 are disposed along the lead screws 212 across from one another, with the cart 112 between them. When the cart 112 is aligned with the members 116, actuators 304 deploy the engagement pins 220 to engage with the cart 112. In some embodiments, the actuators 304 are electrically controllable pneumatic devices or solenoids. In FIG. 3b, the engagements pins 220 have engaged with the cart 112 and the cart 112 is docked with the lead screws 212. Stepper motors 308 are configured to rotate the lead screws 212 to bi-directionally move the members 216 along the lead screws 212. In this way, the stepper motors 308 are configured to move the cart 112 along the precision track section 208 at the processing station 104. In other embodiments, stepper motors 308 are any other actuator suitably configured to operate the lead screws 212.

Once the cart 112 is docked at the processing station 104, the LSM or LIM is not necessary to move the cart 112 along the track 108. Instead, the stepper motors 308 move the cart 112 along the lead screws 212. The lead screws 212 and stepper motors 308 provide highly accurate and controllable movement as the processing station 104 performs an operation or process on the substrate 116. Furthermore, the cart 112 is resilient against changes in fluctuations in weight, speed, and load because the cart 112 is mechanically connected to the structure of the processing station 104. After the processing station 104 has performed the operation or process on the substrate 116, the actuators 304 disengage the engagement pins 220 from the cart 112 to release the cart 112. Once the engagement pins 220 are disengaged, the LSM or LIM within the track 108 moves the cart 112 away from the processing station 104. In some embodiments, the cart 112 moves along the track 108 to a processing station of another printing module.

In this way, the printing module 100 is advantageously configured to move the cart 112 from one printing module to another with the LSM or LIM and to move the cart 112 at the processing zones of the printing module 100 with the lead screws 212 and stepper motors 308. By using separate mechanisms for each purpose, each mechanism can be optimized for that purpose. The LSM or LIM is optimized only for motion between printing modules. Similarly, the stepper motors 308 and lead screws 212 are optimized only for motion at the printing station 104. In some embodiments, the stepper motors 308 and the lead screws 212 are optimized depending on the materials used by the processing station 104 of a particular printing module. In some embodiments, the stepper motors 308 and the lead screws 212 are optimized depending on the weight or size of the cart 112 or the three-dimensional object being manufactured. In further embodiments, the stepper motors 308 and the lead screws 212 are optimized depending on the type of process that is performed by the processing station 104 of a particular printing module. Such optimizations are not feasible if a single mechanism is used for both motion between the processing stations and motion at the processing stations.

FIG. 4a and FIG. 4b show multi-station three-dimensional printing systems 400 and 404, each comprising two or more printing modules that are similar to the printing module 100. FIG. 4a shows a printing system 400 having five processing stations, including four printing stations 408 and a planarizing station 412. FIG. 4b shows a printing system 404 having eight processing stations, including six printing stations 408, a planarizing station 412, and a curing station 416. The printing stations 408 each have at least one printhead configured to eject a material onto a substrate. In some embodiments, each printing station 408 ejects at least one build material, which forms a portion of the object being formed, and at least one support material, which enables the build material to be supported during object formation, but then removed once the object is completed. The planarizing stations 412 have at least one planarizer configured to planarize a substrate. The curing station 416 has at least one curing or cooling device configured to cure or cool the substrate. The particular combination and placement of processing stations is adaptable according to the process steps that are performed to manufacture a finished three-dimensional object.

As discussed with respect the printing module 100 of FIG. 1, the track of each printing module has at least one connecting portion that is configured to interconnect with a connecting portion of another printing module. In the printings systems 400 and 404, the tracks of each printing module are interconnected to form a track 420. The track 420 is configured to provide a path for a cart having a substrate to move along from one processing station to another. In one embodiment, the track 420 has one or more loops 424 configured to connect the processing stations to one another. The loops 424 provide multiple paths between the multiple processing stations. In further embodiments, the loops 424 have four sides defining a generally rectangular shape. In one embodiment, each of the loops 424 shares at least one side with another of the loops 424. When the track 420 is configured as described, several unique paths exist between each processing station and each other processing station. This flexibility in path construction enables the printing systems 400 and 404 to easily accommodate multiple carts and have increased efficiency. In one embodiment, the processing stations are arranged symmetrically about each loop 424. Symmetric configuration helps to balance loads and reduce vibration and frame stress, substantially limiting the need for counter-balancing.

Figure 5:
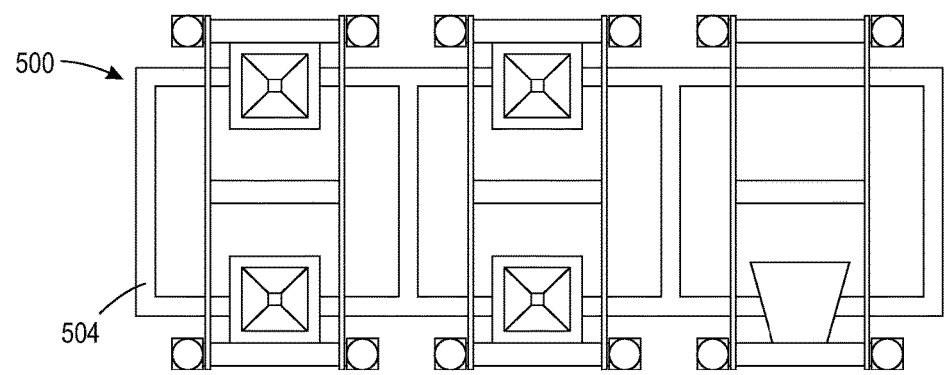
FIG. 5 shows a three-dimensional objecting printing system having a track with unrounded corners.

As depicted in FIG. 4a and FIG. 4b, the loops 424 have rounded corners. However, depending on the particular configuration of the cart and the track, rounded corners can require that the cart partially disengages with the track. FIG. 5 shows a printing system 500, which is similar to the printing system 400 of FIG. 4a, having unrounded corners 504. In one embodiment, the unrounded corner is configured to receive a cart from a path of the corner and to pivot the cart to align with another path of the corner. In this way, the cart traverses the corner without disengaging with the track.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A three-dimensional object printing module comprising:
   a first processing station configured to perform an operation;
   a track configured to guide a cart moved by a motive force in a first direction to the first processing station and to guide the cart moved by the motive force in the first direction from the first processing station;
   at least one guide disposed parallel to the first direction along the track at the first processing station and configured to engage the cart at the first processing station; and
   at least one actuator operatively connected to the at least one guide and configured to move the cart along the track at the processing station without the motive force.

2. The three-dimensional object printing module of claim 1 further comprising:
   a linear induction motor or a linear synchronous motor operatively coupled to the cart to provide the motive force to move the cart along the track towards and away from the first processing station.

3. The three-dimensional object printing module of claim 1, the at least one guide further comprising:
   at least one lead screw; and
   the at least one actuator being further configured to rotate the lead screw bi-directionally about a longitudinal axis of the lead screw to enable the cart to move along the track at the processing station without the motive force.

4. The three-dimensional object printing module of claim 3, the at least one lead screw further comprising:
   a member mounted about the lead screw to enable the member to move bi-directionally as the lead screw rotates bi-directionally; and
   at least one pin extending from the member to contact the cart and enable the cart to move bi-directionally with the member at the first processing station as the lead screw rotates bi-directionally.

5. The three-dimensional object printing module of claim 4, the member further comprising:
   a pneumatic device configured to move the at least one pin into contact with the cart.

6. The three-dimensional object printing module of claim 1, the actuator further comprising:
   a stepper motor.

7. The three-dimensional object printing module of claim 1, the at least one guide further comprising:
   a pair of lead screws disposed along the track at the first processing station in parallel to one another and the first direction; and
   the at least one actuator being further configured to rotate the pair of lead screws bi-directionally about a longitudinal axis of each of the lead screws to enable the cart to move along the track at the processing station without the motive force.

8. The three-dimensional object printing module of claim 7, each lead screw in the pair of leads screws further comprising:
   a member mounted about the lead screw to enable the member to move bi-directionally as the lead screw rotates bi-directionally; and
   at least one pin extending from the member to contact the cart and enable the cart to move bi-directionally with the member at the first processing station as the lead screw rotates bi-directionally, the at least one pin for each lead screw in the pair of lead screws contacting the cart on opposite sides of the cart.

9. The three-dimensional object printing module of claim 1, the first processing station further comprising:
   an ejector head, a planarizer, or a curing device to perform the operation.

10. The three-dimensional object printing module of claim 1, the track further comprising:
    at least one connecting portion configured to interconnect with a corresponding connecting portion of a track that leads to a different three-dimensional object printing module to enable the cart to move from the first processing station to a second processing station of the different three-dimensional object printing module.

11. The three-dimensional object printing module of claim 10, the track further comprising:
    another connecting portion configured to interconnect with the track leading to the first processing station to enable the cart to form a loop to guide the cart from the first processing station to the second processing station and from the second processing station to the first processing station.

12. The three-dimensional object printing module of claim 11, wherein the loop of the track is configured with four sides and four rounded corners that define a rectangular path, the first processing station and the second processing station being symmetrically arranged on opposite sides of the loop.

13. A three-dimensional object printing system comprising:
a plurality of printing modules configured to operate together to manufacture a three-dimensional object, the plurality of printing modules being interconnected to enable a cart to convey the three-dimensional object between one of the plurality of printing modules to another of the plurality printing modules, each printing module comprising:
a processing station configured to perform an operation;
a track configured to guide the cart moved by a motive force in a first direction to the first processing station and to guide the cart moved by the motive force in the first direction from the first processing station;
at least one guide disposed parallel to the first direction along the track at the first processing station and configured to engage the cart at the first processing station; and
at least one actuator operatively connected to the at least one guide and configured to move the cart along the track at the processing station without the motive force.

14. The three-dimensional object printing system of claim 13, the track further comprising:
at least one connecting portion configured to interconnect with a corresponding connecting portion of a track that leads to a different printing module to enable the cart to move from the processing station to a processing station of the different printing module.

15. The three-dimensional object printing system of claim 14, the track further comprising:
another connecting portion configured to interconnect with the track leading to the first processing station to enable the cart to form a loop to guide the cart from the processing station to the processing station of the different printing module and from the processing station of the different printing module to the processing station.

16. The three-dimensional object printing system of claim 15, wherein the loop of the track is configured with four sides and four rounded corners that define a rectangular path, the processing station and the processing station of the different printing module being symmetrically arranged on opposite sides of the loop.

17. The three-dimensional object printing system of claim 13, the at least one guide further comprising:
at least one lead screw; and
the at least one actuator being further configured to rotate the lead screw bi-directionally about a longitudinal axis of the lead screw to enable the cart to move along the track at the processing station without the motive force.

18. The three-dimensional object printing system of claim 17, the at least one lead screw further comprising:
a member mounted about the lead screw to enable the member to move bi-directionally as the lead screw rotates bi-directionally; and
at least one pin extending from the member to contact the cart and enable the cart to move bi-directionally with the member at the first processing station as the lead screw rotates bi-directionally.

19. The three-dimensional object printing system of claim 18, the member further comprising:
a pneumatic device configured to move the at least one pin into contact with the cart.

20. The three-dimensional object printing system of claim 13, the processing station further comprising:
an ejector head, a planarizer, or a curing device to perform the operation.

* * * * *